W. H. CAMBRON.
PLANTER.
APPLICATION FILED FEB. 26, 1916.

1,202,669.

Patented Oct. 24, 1916.
2 SHEETS—SHEET 1.

Inventor
William H. Cambron
By _____ Attorney

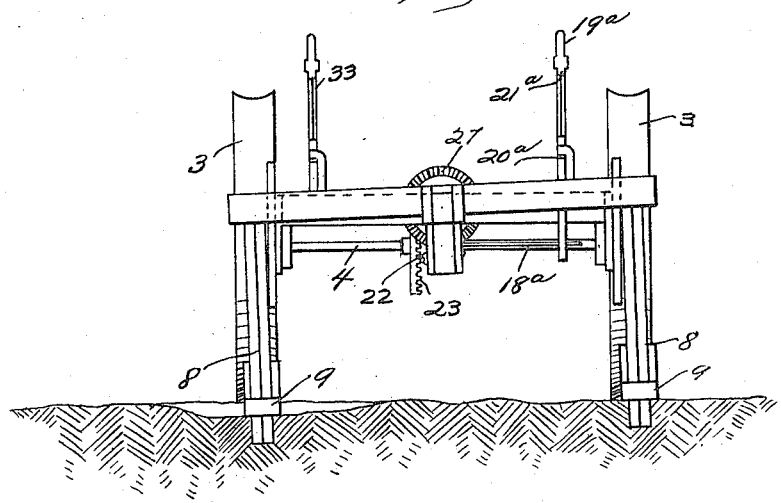
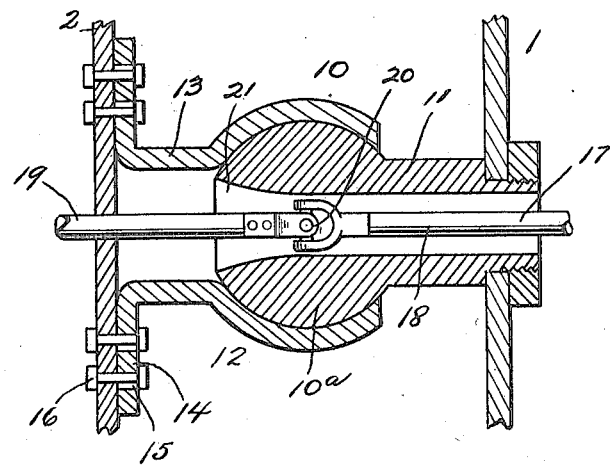

UNITED STATES PATENT OFFICE.

WILLIAM H. CAMBRON, OF WAVERLY, KENTUCKY.

PLANTER.

1,202,669.  Specification of Letters Patent.  Patented Oct. 24, 1916.

Application filed February 26, 1916. Serial No. 80,703.

*To all whom it may concern:*

Be it known that I, WILLIAM H. CAMBRON, a citizen of the United States, residing at Waverly, in the county of Union and State of Kentucky, have invented certain new and useful Improvements in Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in corn and cotton drills.

The invention has for its object, principally, to provide for the suitable dropping or drilling of the corn or cotton into the ground, whether even or uneven, also to provide for the ready yielding of the drilling or planting devices or chutes together with the shoe, when in contact with an obstacle, one drill or chute independently of the other, so that the lifting or interference of one drill or chute will not affect or disturb the operation of the other drill or chute.

Other advantages and facilities of the invention will appear as the description of the construction and operation thereof proceeds.

The invention consists of certain instrumentalities and features of construction substantially as hereinafter fully disclosed and defined by the appended claims.

In the accompanying drawings is illustrated the preferred embodiment of my invention wherein it will be understood that various changes and modifications may be made as to the detailed construction and arrangement of parts without departing from the spirit or scope of the claims, and in which drawings—

Figure 1:
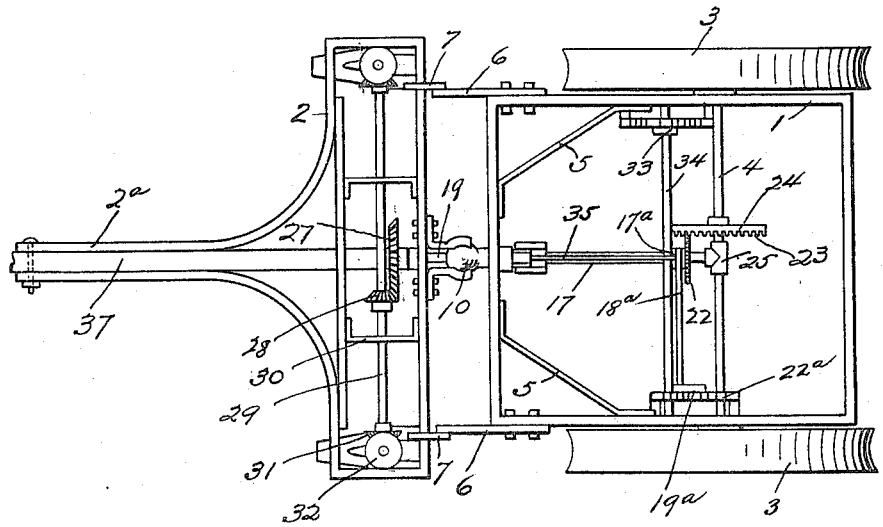
Figure 2:
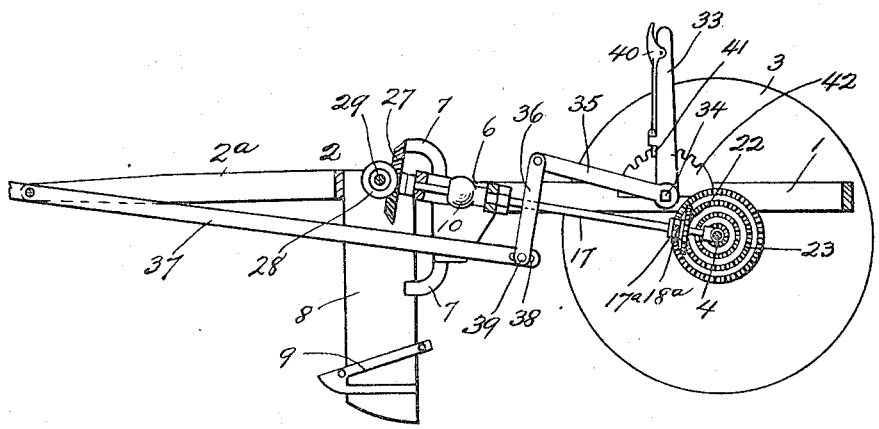

Figure 1 is a plan view of my improved corn and cotton drill or planter with certain adjunctive or concomitant parts omitted, as for instance the seed boxes or holders, driver's seat, etc. Fig. 2 is a longitudinal section of the same. Fig. 3 is a rear elevation of my invention. Fig. 4 is an enlarged detailed sectional and partly fragmental view of the same.

In carrying out my invention, I employ the usual rear seat supporting and transporting-wheel carried frame 1 and the usual forward seed box or holder carrying frame 2, but these are not rigidly connected, their movements being entirely independent of each other and for a special purpose, as will appear from the subsequent disclosure. The rear frame carrying wheels, designated as 3 and whose axle is denoted by the numeral or character 4, are of the usual seed or corn covering type, having concaved peripheries, said frame being preferably strengthened by diagonally arranged braces 5 preferably spanning the frame at its inner forward converse portions and which frame also has bolted to its sides, at the forward end plates 6, forming practically forward extensions of the frame. These plates or forward extensions are themselves each equipped with forwardly extended or curved arms 7, one at the lower edge and the other at the upper edge, which arms are arranged to have suitable engagement within predetermined limits, with the seed-box or hopper frame 2 to guard against the frame having an excess of turning movement either upwardly or downwardly, the extent of movement being restricted within about twelve to eighteen inches. These arms also adapted to provide for holding the seed hopper or boxes evenly out of contact with the ground at the end of the field when the machine is turned. The hopper-frame 2 is, in practice, to be rounded where the arms 7 may have contact therewith to avoid resultant leverage upon the ball and socket joint connection hereinafter described.

The runners or shoes 8 of the general construction are provided with gages 9 of suitable construction and bolted or clamped to the shoes, as seen particularly in Fig. 2, being of substantially triangular frame like formation or outlines, these gages being adapted to prevent the lower runner, shoe or disk, upon which the greater portion of the weight is received from entering the ground beyond the desired depth, and to cause the shoes or runners to always maintain the same depth of penetration when the draft is exerted or applied.

Between the two frames 1 and 2 a ball and socket jointed connection or coupling is effected especially as disclosed by Fig. 4, said coupling or connection, designated generally as 10, including a tubular member 11 with one end reduced and nut-equipped, the reduced end being passed through an end bar of the frame 1 and the nut threaded thereon, whereby said end of the tubular member is fastened to the frame. The opposite end of the tubular member is spherical or ball-shaped as at 10ª and fitted, machine-finished, within the corresponding interior of the other member or socket 12 of the ball and socket joint or coupling, said socket having a tubular neck-extension 13, terminating in a flange 14 provided with slots 15 through which are inserted bolts 16 passed through a bar of the frame 12 and accordingly thus effecting the connection with the latter. The resultant bolt and slot connections provide for the taking up of any lost motion which would otherwise result from wear. Primarily the ball and socket coupling provides for effecting the connection between the frames 1 and 2 whereby the frame 2, carrying the seed hopper or box, is allowed to automatically accommodate its position to the ground-surface, whether even or uneven, or allow the runners or shoes to readily yield in contacting with an obstacle and again regain its original or normal position.

In order to provide for the flexibility of the shaft for actuating the seed dropping disk actuating gearing and shafts, said driving shaft, designated generally as 17, is in sections 18, 19 and extends through the tubular member 11 and the tubular neck 13 of the ball and socket coupling 10, said shaft-sections being connected by a universal joint as at 20 within the tubular member 11, the bore or interior of the latter being somewhat flared outwardly as at 21 at the peripheral terminal of said member for obvious reasons. The shaft 17 has one end adapted to be geared by a pinion 22 thereon with any one of concentric circles of teeth or cogs 23 of a disk 24 mounted or secured upon the axle 4 of the driving and carrying wheels 3, this arrangement, while providing primarily for actuating the shaft 17, also provides for varying the rotation of the shaft by suitably adjusting the pinion 22 into gear with a greater or less sized circle of teeth 23, which will, of course, allow of varying the intervals apart of planting or dropping the corn or cotton seed in the ground. In order to provide for effecting the adjustment or shifting of the pinion 22 with respect to any of the toothed circles 23, said pinion is carried by a tubular member or sleeve 17ª slidably arranged upon the shaft 17, but not rotatable independently thereof, the tubular member or sleeve 17ª being controlled by a fork or rod-member 18ª having attached thereto, and adapted to be suitably actuated thereby a manually operated lever 19ª suitably arranged for manipulation from the operator's seat. The lever 19ª is suitably equipped with a detent 20ª adapted to be actuated by a spring-retained latch 21ª applied to said lever 19ª and engaging a toothed quadrant or rack 22ª secured to the machine frame 1. The shaft 17 is supported at one end preferably by letting it into a socket or bearing 25 sleeved upon, and through which freely passes, the axle 4 of the wheels 3, as a convenient way of supporting said socket. The opposite or high end of shaft 17 extends through a bar of the frame 2, within which it bears, and extends somewhat beyond it and carries a beveled pinion 27 geared to a quite small pinion 28 carried by a shaft 29 suitably supported, as shown in preferably transverse bars 30 of the frame 2 and which shaft 29 carries at its ends beveled pinions 31 meshing with correspondingly beveled gears 32 of the seed dropping disks (not shown) in the seed hopper or box (not shown) whereby the seed-corn, or cotton-seeds are suitably drilled or dropped into the earth, as well understood.

The seed-hopper carrying frame 2, being independent of, or disconnected from the operator's seat carrying-frame 1, is under the control of the operator through a lever 33 slipped upon, and secured to a rock-bar 34, rectangular in cross-section and bearing in the frame 1, said rock-bar having also slipped thereon one end of a bar or arm 35 which accordingly is adapted to be controlled by said lever. Said arm or bar 35 is pivotally connected to the upper ends of parallel resilient metal members or springs 36 in turn connected, at their lower ends, to the inner end of the tongue or draft-bar 37 suitably connected or pivoted to and between forwardly projecting converging extensions 2ª of the frame 2. This arrangement provides for effecting the vertical adjustment or lifting of the forward end frame 2, with the tongue, and accordingly provides for the like adjustment of the runner or member 8 as occasion may require. The connection between the tongue or member 37 and the parallel resilient members or springs 36 is effected by providing the tongue with a longitudinal slot 38 and inserting therethrough and the members 36, a rivet or pin 39 suitably headed in place therein, as seen particularly in Fig. 2 the tongue being received between the members 36, as is also the shaft 17, said connection providing against any binding action at that point between said parts. The lever 23 is equipped with a finger-actuated latch 40 adapted to control a detent 41 slidably and spring-held upon the lever and adapted to engage a toothed quadrant or rack 42 secured to the frame 1, for holding the lever in adjusted position.

It is believed that from the foregoing description and accompanying illustration, the operation of my invention will be readily understood and the advantages thereof appreciated.

I claim:

1. A planter of the type described, including a frame member mounted in connection with means from which the source of driving power may be derived, a second frame member upon which is mounted the seed-receptacle, a ball and socket jointed coupling between said frame-members, a universally jointed shaft, the ball member of said ball and socket jointed coupling being tubular and said coupling housing the connection between the members of said universally jointed shaft, means of connection between said shaft and the driving power, and means for actuating the seed dropping means of said seed receptacle from said shaft.

2. A planter of the type described, including a frame-member mounted in connection with means from which the driving power may be derived, a second frame-member upon which is mounted the seed-receptacle, means for actuating the seed-dropping means of said seed-receptacle arranged to be actuated from said driving power, means for effecting a coupling connection between the frame-member bearing the seed-receptacle and said universally jointed shaft, and adjusting means for said seed-receptacle bearing frame-member and its seed delivering means, including a hand actuated lever, a pivotally positioned member connected to the planter draft-bar member, a rock-bar bearing in one of said frame-members, and forming a fulcrum for said lever, said rock-bar being equipped with a fixed arm, parallel resilient members intermediate said rock-shaft arm and said draft-bar connected member.

3. A planter of the type described including a frame-member mounted in connection with means from which the driving power may be derived, a second frame-member bearing the seed-receptacle, a flexible coupling between said frame-members, and a universally jointed shaft between the drive-power and the seed-dropping actuating means, the first referred to being equipped with a member having arcuate or curved terminals adapted to control the position of said second frame-member and its adjunctive parts with respect to the evenness or unevenness of the ground as the draft is exerted upon the planter.

In testimony whereof, I affix my signature, in presence of two witnesses.

WILLIAM H. CAMBRON.

Witnesses:
L. I. MANNING,
G. L. DRURY.

Copies of this patent may be obtained for five cents each, by addressing the "Commissioner of Patents, Washington, D. C."